US010066115B2

(12) United States Patent
Zhou et al.

(10) Patent No.: US 10,066,115 B2
(45) Date of Patent: *Sep. 4, 2018

(54) MAGNETIC ACTUATED-MILLED PIGMENT DISPERSIONS AND PROCESS FOR MAKING THEREOF

(71) Applicant: XEROX CORPORATION, Norwalk, CT (US)

(72) Inventors: Ke Zhou, Oakville (CA); Frank Ping Hay Lee, Oakville (CA); Harry Latchman, Mississauga (CA); Yulin Wang, Oakville (CA); Sandra J. Gardner, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 44 days.

This patent is subject to a terminal disclaimer.

(21) Appl. No.: 15/351,116

(22) Filed: Nov. 14, 2016

(65) Prior Publication Data

US 2017/0066942 A1 Mar. 9, 2017

Related U.S. Application Data

(63) Continuation of application No. 14/328,625, filed on Jul. 10, 2014, now abandoned.

(51) Int. Cl.
*C09D 17/00* (2006.01)
*B02C 17/00* (2006.01)

(52) U.S. Cl.
CPC .......... *C09D 17/001* (2013.01); *B02C 17/005* (2013.01); *C09D 17/003* (2013.01)

(58) Field of Classification Search
CPC ........................... B02C 17/005; B02C 17/163
See application file for complete search history.

(56) References Cited

U.S. PATENT DOCUMENTS

| | | |
|---|---|---|
| 3,590,000 A | 6/1971 | Palermiti |
| 3,644,263 A | 2/1972 | Burke, Jr. |
| 3,800,588 A | 4/1974 | Larson |
| 3,879,327 A | 4/1975 | Burke, Jr. |
| 4,243,566 A | 1/1981 | Burke, Jr. |
| 4,298,672 A | 11/1981 | Lu |
| 4,338,390 A | 7/1982 | Lu |
| 5,026,427 A | 6/1991 | Mitchell |
| 5,028,142 A | 7/1991 | Ostoich |
| 5,085,698 A | 2/1992 | Ma |

(Continued)

FOREIGN PATENT DOCUMENTS

JP WO 2013099730 A1 7/2013

OTHER PUBLICATIONS

Jain, V.K., Sidpara, A. Sankar, M.R. and Das, M., Proceedings of the Institution of Mechanical Engineers, Part C: Journal of Mechanical Engineering Science, Oct. 26, 2011; pp. 326-346.

(Continued)

*Primary Examiner* — Shuangyi Abu Ali
(74) *Attorney, Agent, or Firm* — Pillsbury Winthrop Shaw Pittman LLP

(57) ABSTRACT

The disclosure provides pigment dispersions having an average particle size of from about 10 nm to about 500 nm prepared by employing a magnetic actuated milling process and system. In embodiments, the pigment dispersions have an average particle size of less than 100 nm.

17 Claims, 6 Drawing Sheets

(56) References Cited

U.S. PATENT DOCUMENTS

| | | | |
|---|---|---|---|
| 5,183,214 A * | 2/1993 | Zakheim | B02C 17/163 |
| | | | 241/172 |
| 5,346,797 A | 11/1994 | Kmiecik-Lawrynowicz | |
| 5,364,729 A | 11/1994 | Kmiecik-Lawrynowicz | |
| 5,403,693 A | 4/1995 | Patel | |
| 5,417,747 A | 5/1995 | Arata | |
| 5,418,108 A | 5/1995 | Kmiecik-Lawrynowicz | |
| 5,500,331 A * | 3/1996 | Czekai | B02C 17/20 |
| | | | 241/184 |
| 5,501,935 A | 3/1996 | Patel | |
| 5,527,658 A | 6/1996 | Hopper | |
| 5,585,215 A | 12/1996 | Ong | |
| 5,650,255 A | 7/1997 | Ng | |
| 5,650,256 A | 7/1997 | Veregin | |
| 5,835,329 A | 11/1998 | Sucholeiki | |
| 5,853,943 A | 12/1998 | Cheng | |
| 5,916,725 A | 6/1999 | Patel | |
| 6,063,827 A | 5/2000 | Sacripante | |
| 6,120,967 A | 9/2000 | Hopper | |
| 6,187,270 B1 | 2/2001 | Schmitt | |
| 6,214,507 B1 | 4/2001 | Sokol | |
| 6,593,049 B1 | 7/2003 | Veregin | |
| 6,756,176 B2 | 6/2004 | Stegamat | |
| 6,764,859 B1 | 7/2004 | Kreuwel | |
| 6,830,860 B2 | 12/2004 | Sacripante | |
| 7,517,457 B2 | 4/2009 | Siddiqi | |
| 7,683,142 B2 | 3/2010 | Lai | |
| 7,947,761 B2 | 5/2011 | Shakhnovich | |
| 7,977,024 B2 | 7/2011 | Zhou | |
| 8,124,309 B2 | 2/2012 | Lai | |
| 8,163,459 B2 | 4/2012 | Farrugia | |
| 8,168,699 B2 | 5/2012 | Lincoln | |
| 8,871,420 B1 | 10/2014 | Liu et al. | |
| 9,234,090 B2 | 1/2016 | Liu et al. | |
| 2006/0063084 A1 | 3/2006 | Sweeney | |
| 2006/0222991 A1 | 10/2006 | Sacripante | |
| 2007/0207272 A1 | 9/2007 | Puri | |
| 2009/0047431 A1 * | 2/2009 | Hatada | C09D 11/101 |
| | | | 427/256 |
| 2014/0335358 A1 | 11/2014 | Hoshino | |
| 2015/0131405 A1 | 5/2015 | Zhou | |
| 2015/0251186 A1 | 9/2015 | Zhou | |

OTHER PUBLICATIONS

Shorey, Aric Bruce, Mechanisms of Material Removal in Magnetorheological Finishing (MRF) of Glass, 2000; pp. 88-100.

Martin, et al., "Strong intrinsic mixing in vortex magnetic fields" Physical Review E 80, 016312 (pp. 1-6) (2009).

Wang, et al., "A rapid magnetic particle driven micromixer" Microfluid Nanofluid (2008) 4:375-389.

Rida, et al., "Manipulation of Self-Assembled Structures of Magnetic Beads for Microfluidic Mixing and Assaying" Anal. Chem. (2004) 76, 6239-6246.

* cited by examiner

MAGNETIC ACTUATED-MILLED PIGMENT DISPERSIONS AND PROCESS FOR MAKING THEREOF

CROSS REFERENCE TO RELATED APPLICATION

This application is a continuation of, and claims the benefit of priority to, U.S. patent application Ser. No. 14/328,625, filed Jul. 10, 2014, the entire contents of which is incorporated herein by reference.

BACKGROUND

Pigments are typically the more costly components of ink and toner. The cost of the conventional pigment dispersion process, in some instances, can reach as high as about 50% of the total cost of the pigment dispersion. Conventional pigment dispersion processes are very costly and energy intensive, which is time consuming and require frequent parts replacement and instrument maintenance.

The disclosure provides a cost effective process to prepare pigment dispersion by employing a method and system for magnetic actuated mixing which use magnetic particles and electromagnetic field to facilitate milling of different materials. In embodiments, the magnetic actuated mixing method can prepare ultrafine pigment dispersions having a pigment particle size of less than 100 nm.

It is known in the pigment art that the smaller the pigment particle size, the higher the color strength is produced. The color strength is an essential property of pigments. It defines the amount of pigment necessary to obtain a desired color shade. To reduce cost, the industry tends to achieve the most color strength from using the least possible amount of pigments. Thus, pigment loading can be reduced by using smaller particles pigment. Smaller pigment particles also provide better saturation, gloss, hiding power, dispersion, flow, and help prevent print head congestion. Thus, it is desirable to reduce the size of the pigment dispersions.

In the present embodiments, the mixing of materials uses the step of milling. Milling is the process of breaking down material and thus involves particle size reduction. The magnetic particles act as milling media. The system includes non-magnetic abrasive particles in the milling media to facilitate the milling. The present embodiments may be used in many different applications, including for example, preparing toners, inks, wax, pigment dispersions, paints, photoreceptor materials and the like. The present embodiments may be used for any application that requires the preparation of small-sized particles at either the micro or nano scale.

In many batch processes, the milling step is one of most critical steps to determine the overall performance of the process. For example, in applications where small-sized particles are produced, achieving the small scale and uniform distribution of the particles is determined by the milling step.

SUMMARY

The present disclosure provides a pigment dispersion comprising a milled pigment having an average particle size of from about 10 nm to about 500 nm dispersed in an aqueous medium, wherein the pigment dispersion is prepared from the method comprising contacting a pigment with magnetic particles and non-magnetic abrasive particles; agitating the pigment, and non-magnetic abrasive particles; applying a constant magnetic field to the magnetic particles; milling the pigment with the magnetic and the non-magnetic abrasive particles until the average particle size is within the desired range of from about 10 nm to about 500 nm.

In certain embodiment, the disclosure provides a pigment dispersion comprising a milled yellow pigment having an average particle size of from about 10 nm to about 100 nm dispersed in an aqueous medium, wherein the pigment dispersion is prepared from the method comprising contacting a yellow pigment with magnetic particles and non-magnetic abrasive particles; applying a constant magnetic field to the magnetic particles; milling the yellow pigment with the magnetic and the non-magnetic abrasive particles until the average particle size is less than 100 nm.

BRIEF DESCRIPTION OF THE DRAWINGS

For a better understanding of the present embodiments, reference may be made to the accompanying figures.

DETAILED DESCRIPTION

Figure 1:
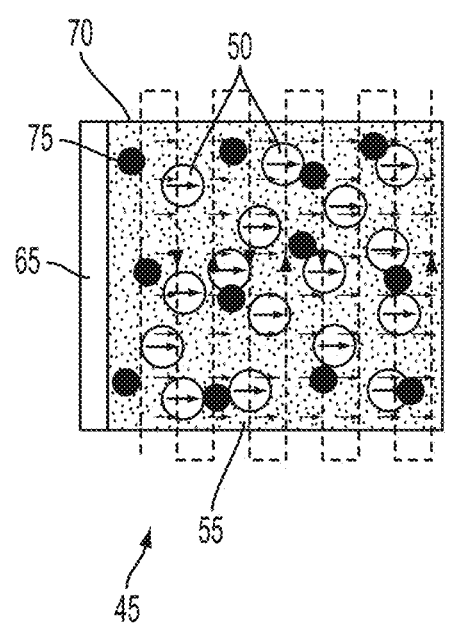
FIG. 1 is a diagram of a magnetic actuated mixing system in accordance with the present embodiments.

In the following description, reference is made to the accompanying drawings, which form a part hereof and which illustrate several embodiments. It is understood that other embodiments may be utilized and structural and operational changes may be made without departure from the scope of the present disclosure. The same reference numerals are used to identify the same structure in different figures unless specified otherwise. The structures in the figures are not drawn according to their relative proportions and the drawings should not be interpreted as limiting the disclosure in size, relative size, or location.

The term "D50" used herein refers to the 50th percentile of the particle size distribution, wherein 50% of the particles in the distribution are greater than the D50 particle size value and the other 50% of the particles in the distribution are less than the D50 value. Average particle size data can be measured by methods that use light scattering technology to infer particle size, such as Dynamic Light Scattering.

The present embodiments provide pigment dispersions prepared by employing a magnetic actuated milling process and system which use magnetic particles, non-magnetic abrasive particles and a magnetic field to facilitate the milling.

The magnetic actuated milling process and system of the embodiments employ a constant magnetic field across a mixing vessel that contains pigments, magnetic particles, and non-magnetic abrasive particles in a medium (e.g., solvents) with agitation.

In embodiments, as shown in FIG. 1, there is provided a mixing system 45 comprising magnetic particles 50 and non-magnetic abrasive particles 75 loaded in a solution containing pigments 55 which is moved to actuate milling by a constant magnetic field 60 applied to the magnetic particles 50. The magnetic particles may be pre-loaded or filled into the milling vessel 70 when milling is needed. A constant magnetic field 60 may be applied through one or more electromagnets, or a permanent magnet 65 on either side of the milling vessel 70. The magnetic fields may be stationary or moving. The magnetic field may have a strength of from about 10 Gauss to about 50,000 Gauss, or from about 50 Gauss to about 20,000 Gauss, from about 100 Gauss to about 15,000 or from about 200 Gauss to about 10,000 Gauss. The pigment and the non-magnetic abrasive particles 75 may be agitated during parts of or during the entire milling process. During agitation, the magnetic particles 50 may be relatively stationary due to the influence of the constant magnetic field 60. However, the magnetic particles 50 may be bounced and moved slightly by the motion of the other particles in the solution. The magnetic particles 50 may collide with the pigment particles 55 and the non-magnetic abrasive particles 75. The mixing system 45 achieves intense micro mixing zone 75 uniformly throughout the mixing vessel 70. The agitation may be performed in any suitable agitating means. For example, the vessel 70 may be spun or shaken, or a stirrer may be added to the vessel 70 to mix the pigment dispersion. The agitation may be performed in the range of from about 50 to about 10,000 rpm, or from about 100 to about 5,000 rpm. The magnetic particles can be successfully collected and recycled by electromagnets for subsequent applications. The non-magnetic particles may be removed by any method including filtering, centrifuging, and the like.

The magnetic particles may be include diamagnetic, paramagnetic, ferrimagnetic, ferromagnetic or antiferromagnetic materials such that the overall magnetic particle is paramagnetic, ferrimagnetic, ferromagnetic or antiferromagnetic. In some exemplary embodiments, the magnetic particles may comprise Fe, $Fe_2O_3$, Ni, $CrO_2$, or Cs. In specific embodiments, the magnetic particles include carbonyl iron and carbonyl nickel. In embodiments, the magnetic particles may have a non-magnetic coating. In other embodiments, the magnetic particles can also be encapsulated with a shell, for example, a polymeric shell comprising, in embodiments, polystyrene, polyvinyl chloride, TEFLON®, PMMA, and the like and mixtures thereof. The magnetic particles may have a diameter of from about 5 nm to about 1000 µm, or from about 10 nm to about 500 µm, or from about 100 nm to about 100 µm. The size of magnetic particles can be chosen based on different applications or processes. In embodiments, the volume percentage of magnetic particles used for mixing may also vary depending on the different application or process for which the particles are being used. For example, from about 5% to about 80%, or from about 10% to about 50%, or from about 15% to about 25% magnetic particles may be added to the vessel.

It was discovered that the addition of non-magnetic abrasive particles to the milling media provided a better actuated milling. The non-magnetic abrasive particles, like those used as polishing abrasives in the magnetorheological finishing industry, are hard micron-sized materials responsible for material size reduction (for example, see Nanoindentation Hardness of Particles Used in Magnetorheological Finishing (MRF) Aric B. Shorey, Kevin M. Kwong, Kerry M. Johnson, and Stephen D. Jacobs Applied Optics, Volume 39, Issue 28 (2000)). These abrasive particles have hardness values that exceed those of magnetic particles. When used in conjunction with the magnetic particles, the non-magnetic abrasive particles provide even more effective results in solid particle size reduction, especially in grinding certain pigment particles. The collision and shearing between the magnetic particles and non-magnetic abrasive particles and not only achieve the desired small scale and uniform distribution of the mixed particles, but to do so quickly. The non-magnetic particles may be later removed by any method including filtering, screening, centrifuging, and the like. While the use of the non-magnetic abrasive particles does add to the system components and process steps, the smaller particle sizes achieved outweigh any drawbacks.

The non-magnetic abrasive particles may comprise one or more of aluminum oxide, silicon carbide, cerium oxide, zirconium oxide, ferric oxide, bauxite, cubic zirconia and diamond powder, and the like and mixtures thereof. In embodiments, the abrasive particles may have a diameter of less than 1 mm. In other embodiments, the abrasive particles may have a diameter of from about 5 nm to about 1000 µm, or from about 10 nm to about 500 µm, or from about 100 nm to about 100 µm. The size of non-magnetic abrasive particles can be chosen based on different applications or processes. The non-magnetic abrasive particles have a nano indentation hardness value of at least 4.9, or from about 5 to about 50, or from about 7.5 to about 50 GPa. The non-magnetic abrasive particles may have any regular or irregular shape including spherical, cubic, hexagonal, rod-shaped, granular, elliptical, flake, and the like and mixtures thereof. In embodiments, the volume percentage of non-magnetic abrasive particles (based on the total dry volume of the milling media) used for milling may also vary depending on the different application or process for which the particles are being used. For example, from about 5% to about 95%, or from about 10% to about 80%, or from about 20% to about 70% non-magnetic abrasive particles may be added to the vessel.

In specific embodiments, a weight ratio of magnetic particles to non-magnetic abrasive particles may be in a range of from about 0.5:10 to about 10:0.5, or from about 1:10 to about 10:1, or from about 2:10 to about 10:2. In further embodiments, a volume ratio of the total milling media (magnetic particles and non-magnetic abrasive particles) to the material to be mixed may be in a range of from about 0.5:10 to about 10:0.5, or from about 1:10 to about 10:1, or from about 2:10 to about 10:2.

In embodiments, the resulting particles sizes of the pigment dispersions achieved by the actuated milling are from about 10 nm to about 500 nm, from about 20 nm to about 400 nm, or from 50 nm to about 300 nm. In embodiments, certain pigments may achieve even smaller particles sizes of less than 100 nm, for example, from about 10 nm to about 100 nm, from about 30 nm to about 95 nm, from about 40 nm to about 95 nm, or from about 50 nm to about 95 nm.

If micro sized magnetic particles are used, due to the large surface contact area between micro magnetic particles and the solution, micro milling due to enhanced local diffusion significantly produces homogeneous and global milling. The present embodiments thus provide small particles on the nano to micro scale and uniform distribution. The present embodiments also provide for the potential of higher viscosity (for example, a viscosity of from about 0.1 cP to about 100,000 cP, from about 0.5 cP to about 50000 cP, or from about 1 cP to about 10000 cP at 25° C.) milling if the exposed magnetic field is large.

Another advantage of the present method and system is the fact that it is free of mechanical components and thus maintenance, which significantly reduces the cost of the system. The present embodiments are also free of noise.

The present embodiments may be used in many different applications, including solids dispersions for example, preparing toners, inks, wax, pigment dispersions and the like. The present embodiments may be used for any application that requires the preparation of small-sized particles at either the micro or nano scale.

Pigment Dispersions

Pigment dispersions are often used in the preparation of EA toners or inks. Conventional milling methods used for preparing pigment dispersions suffer from many drawbacks. In addition, the use of conventional milling methods consume lengthy periods of time to prepare the pigment dispersions, often exceeding four hours.

The present embodiments provide for the use of magnetic actuating motion of magnetic particles to prepare pigment dispersions as provided by milling capabilities at nano or micro scale. These embodiments apply a constant magnetic field to align the magnetic particles. The magnetic particles may be agitated by moving the magnetic field, where the magnetic source may be arranged in a movable manner (e.g., rotatable or tiltable manner) The motion of pigment particles and non-magnetic abrasive particles may be driven by agitation via, for example, stirring or homogenizing the solution, spinning or shaking of the vessel.

In one embodiment, the pigment particles and the non-magnetic abrasive particles may be agitated, while the magnetic particles may be stationary. In one embodiment, the pigment particles and the non-magnetic abrasive particles may be stationary, while the magnetic particles may be agitated. In one embodiment, the pigment particles and the non-magnetic abrasive particles may be agitated (by stirring or homogenize the solution, or spinning or shaking motion of the vessel), while the magnetic particles may be agitated (by influence of the movement of the magnetic field). Different motions of magnetic particles and non-magnetic particles, including the pigment particles and the non-magnetic abrasive particles, provide consistent nano or micro scale collision and shearing throughout the entire vessel, thus providing uniform dispersion of materials within a very short time frame (e.g., minutes).

In embodiments, a dry pigment may be loaded in a solvent (i.e., pigment/solvent mixture), such as water, an organic solvent, or mixtures thereof, into the vessel. In embodiments, the pigment may include a blue pigment, a black pigment, a cyan pigment, a brown pigment, a green pigment, a white pigment, a violet pigment, a magenta pigment, a red pigment, an orange pigment, a yellow pigment, or mixtures thereof.

Suitable pigments include those comprising carbon black, such as, REGAL 330® and Nipex 35. Colored pigments, such as, cyan, magenta, yellow, red, orange, green, brown, blue or mixtures thereof can be used. The additional pigment or pigments can be used as water-based pigment dispersions.

Examples of pigments include SUNSPERSE 6000, FLEXIVERSE and AQUATONE, water-based pigment dispersions from SUN Chemicals; HELIOGEN BLUE L6900™, D6840™, D7080™, D7020™, PYLAM OIL BLUE™, PYLAM OIL YELLOW™ and PIGMENT BLUE I™ available from Paul Uhlich & Company, Inc.; PIGMENT VIOLET I™, PIGMENT RED 48™, LEMON CHROME YELLOW DCC IO26™, TOLUIDINE RED™ and BON RED C™ available from Dominion Color Corporation, Ltd., Toronto, Ontario; NOVAPERM YELLOW FGL™ and HOSTAPERM PINK E™ from Hoechst; CINQUASIA MAGENTA™ available from E.I. DuPont de Nemours & Co., and the like.

Examples of magenta pigments include 2,9-dimethyl-substituted quinacridone, an anthraquinone dye identified in the Color Index as CI 60710, CI Dispersed Red 15, a diazo dye identified in the Color Index as CI 26050, CI Solvent Red 19 and the like.

Illustrative examples of cyan pigments include copper tetra(octadecylsulfonamido) phthalocyanine, a copper phthalocyanine pigment listed in the Color Index as CI 74160, CI Pigment Blue, Pigment Blue 15:3, Pigment Blue 15:4, an Anthrazine Blue identified in the Color Index as CI 69810, Special Blue X-2137 and the like.

Illustrative examples of yellow pigments are diarylide yellow 3,3-dichlorobenzidene acetoacetanilide, a monoazo pigment identified in the Color Index as CI 12700, CI Solvent Yellow 16, a nitrophenyl amine sulfonamide identified in the Color Index as Foron Yellow SE/GLN, CI Disperse Yellow 3, 2,5-dimethoxy-4-sulfonanilide phenylazo-4'-chloro-2,5-dimethoxy acetoacetanilide and Permanent Yellow FGL.

Other known colorants can be used, such as, Levanyl Black A-SF (Miles, Bayer) and Sunsperse Carbon Black LHD 9303 (Sun Chemicals), and colored dyes, such as, Neopen Blue (BASF), Sudan Blue OS (BASF), PV Fast Blue B2G 01 (American Hoechst), Sunsperse Blue BHD 6000 (Sun Chemicals), Irgalite Blue BCA (CibaGeigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991 K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), SUCD-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871 K (BASF), Paliogen Red 3340 (BASF), Lithol Fast Scarlet L4300 (BASF), combinations of the foregoing and the like. Other pigments that can be used, and which are commercially available include various pigments in the color classes, Pigment Yellow 74 (2-((2-methoxy-4-nitrophenyl)azo)-n-(2-methoxyphenyl)-3-oxo-butanamid), Pigment Yellow 14, Pigment yellow 93, Pigment yellow 34, Pigment yellow 180, Pigment yellow 83, Pigment yellow 139, Pigment yellow 151, Pigment yellow 13, Pigment yellow 191, Pigment Orange 34, Pigment Red 238, Pigment Red 122, Pigment Red 48:1, Pigment Red 269, Pigment Red 53:1, Pigment Red 57:1, Pigment Red 83:1, Pigment Violet 23, Pigment Green 7 and so on, and combinations thereof.

In embodiments, the weight ratio of the pigment to solvent in the pigment/solvent mixture may be from about 5/95 to about 80/20, from about 10/90 to about 50/50, or from about 15/85 to about 20/80.

In embodiments, the weight of the milled pigment is from about 1 to about 50%, from about 3 to about 45%, from about 5 to about 40%, by weight based on the pigment dispersion.

A surfactant may be added to and mixed with the pigment/solvent mixture in the vessel. In embodiments, the surfactant can be water-soluble polymers, or water-soluble surfactants. In embodiments, the surfactant is added in an amount of from 1% to about 30%, or from about 3% to about 15%, or from about 5% to about 12% by weight of the total weight of the mixture in the vessel.

Any type of surfactant may be used, with anionic, cationic or nonionic surfactants being utilized in some embodiments. Examples of nonionic surfactants that can be utilized include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc Industries SA as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC PE/F, in embodiments SYNPERONIC PE/F 108.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku Co. Ltd., combinations thereof, and the like. Other suitable anionic surfactants include, in embodiments, DOWFAX™ 2A1, an alkyldiphenyloxide disulfonate from The Dow Chemical Company, and/or TAYCAPOWER BN2060 from Tayca Corporation, which are branched sodium dodecyl benzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Corporation, and the like, and mixtures thereof.

In embodiments, an ultrafine pigment dispersions having an average particle size of less than 100 nm can be prepared using the magnetic actuated milling method and system of the present disclosure. A magnetic field can be generated and applied to the mixture and magnetic particles in the vessel. The magnetic field for preparing ultrafine pigment dispersions may have a strength of from about 200 Gauss to about 10,000 Gauss, or from about 100 Gauss to about 10,000 Gauss. A pigment dispersion with the desired particle size can be then achieved by different motions of the magnetic particles nonmagnetic particles under the magnetic field and agitation. A reduction in pigment particles can be achieved. The duration and speed of milling may be dependent on the pigment color and pigment particle size desired. Generally, the duration of milling may range from about 0.01 to about 5000 hours, from about 0.1 to about 2000 hours, or from about 0.2 to about 1000 hours. A longer milling may in some cases be necessary or desirable but the process can in any particular instance be controlled by periodic examination of a sample to ascertain when a product having the desired particle characteristics and the like has been obtained. In embodiments, to achieve the ultrafine pigment dispersions, the rate of the agitation may range from about 50 to about 20,000 rpm, range from about 100 to about 10,000 rpm. The magnetic particles and non-magnetic abrasives abrasive particles can then be collected for re-use.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The example set forth herein below is illustrative of different compositions and conditions that can be used in practicing the present embodiments. All proportions are by weight unless otherwise indicated. It will be apparent, however, that the embodiments can be practiced with many types of compositions and can have many different uses in accordance with the disclosure above and as pointed out hereinafter. The embodiments will be described in further detail with reference to the following examples and comparative examples. All the "parts" and "%" used herein mean parts by weight and % by weight unless otherwise specified.

The example set forth herein below is illustrative of different compositions and conditions that can be used in practicing the present embodiments. All proportions are by weight unless otherwise indicated. It will be apparent, however, that the embodiments can be practiced with many types of compositions and can have many different uses in accordance with the disclosure above and as pointed out hereinafter. The embodiments will be described in further detail with reference to the following examples and comparative examples. All the "parts" and "%" used herein mean parts by weight and % by weight unless otherwise specified.

Example 1

Figure 2:
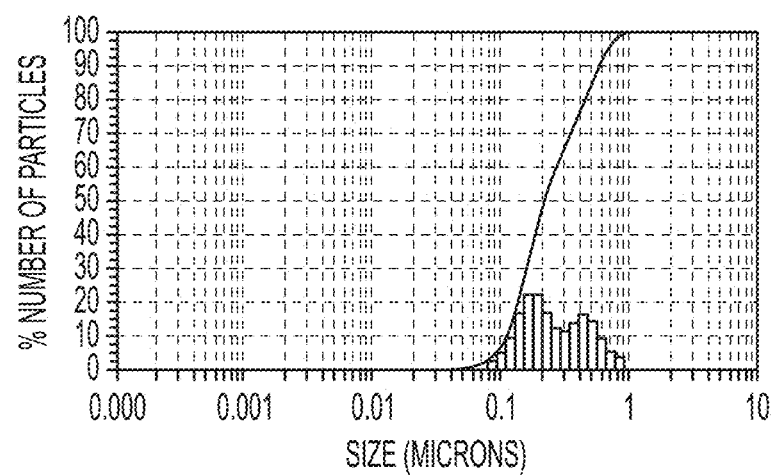
FIG. 2 is a graph illustrating the particle size and particle size distribution of a pigment dispersion prior to magnetic milling in accordance with the present embodiments.
Figure 3:
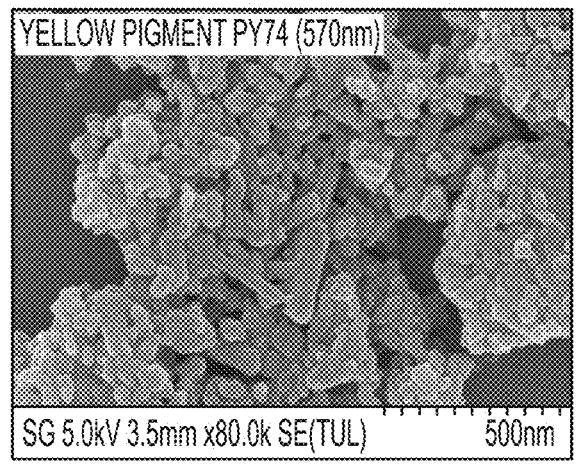
FIG. 3 is a Transmission Electron Microscopy (TEM) image of a pigment dispersion prior to magnetic milling in accordance with the present embodiments.

Preparation of Wetted Yellow Pigment Dispersion 125.0 g Pigment PY74, 65.93 g surfactant ((18.75 wt %) tayca power solution from Tayca Corporation), 201.53 g deionized water (DIW) was mixed together in a 1 L glass bottle and stirred for about 15 hours. The particle size and particle size distribution of the wetted yellow pigment dispersion (i.e., the resulting mixture) are shown in FIG. 2. The TEM image of the wetted yellow pigment dispersion is shown in FIG. 3. The D50 of the wetted yellow pigment dispersion was measured to be about 211 nm.

Magnetic Milling

Magnetic milling was conducted with magnetic particles and non-magnetic abrasives. Into a 9 mL glass vial was added 2.66 g of the wetted pigment dispersion obtained above, and 1.31 mL (3.25 g) of 35 micron iron oxide magnetic particles and 1.31 mL (1.82 g) of non-magnetic abrasives $Al_2O_3$ (<10 micron) at about 50:50 abrasive concentration. The abrasive concentrations were calculated as follows:

$$\text{Abrasive concentration} = \frac{\text{Abrasive Dry Volume}}{\text{Total Dry Volume of Milling Media}}$$

Figure 4:
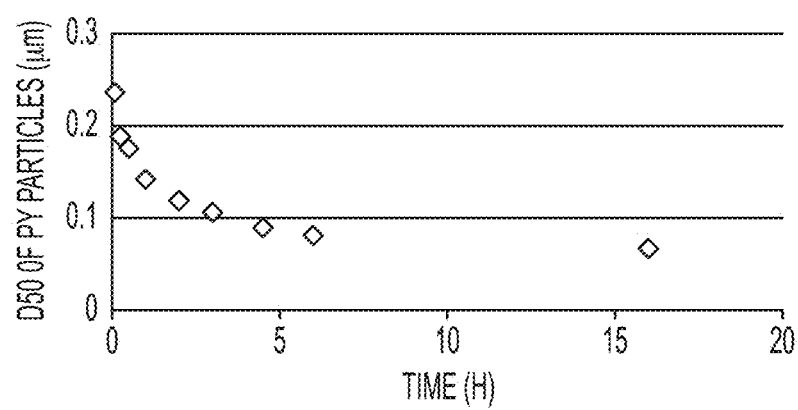
FIG. 4 is a graph illustrating the change of particle size of a pigment dispersion during the magnetic milling in accordance with the present embodiments.

The vial was then spinned using an agitator at 250 rpm beside a permanent magnet having magnetic field about 400 mT. The particle size of pigment was then measured at different time interval. Table 1 summarizes the mean diameter of the yellow pigment over the duration of the magnetic milling, and FIG. 4 shows the change of particle size in time over the duration of the magnetic milling.

TABLE 1

| Time (h) | Mean Diameter (micron) |
|---|---|
| 0.0 | 0.211.1 |
| 0.25 | 0.1889 |
| 0.50 | 0.1758 |
| 1.00 | 0.1421 |
| 2.00 | 0.119 |
| 3.00 | 0.1064 |
| 4.50 | 0.0901 |
| 6.00 | 0.0814 |
| 16.00 | 0.0674 |

Figure 5:
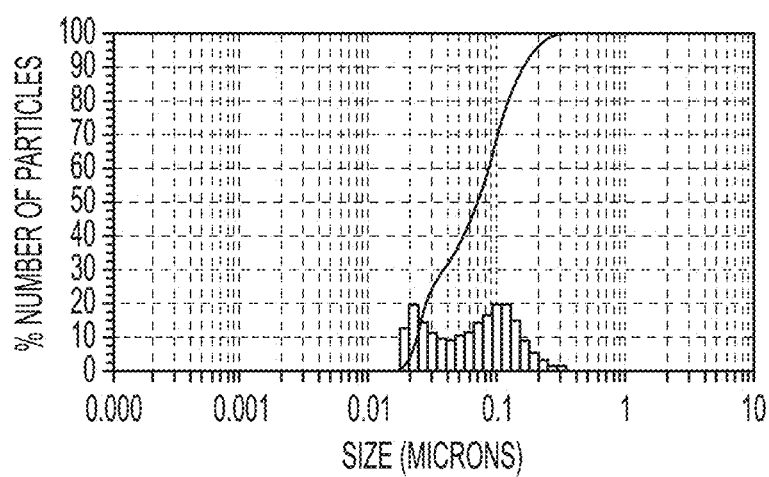
FIG. 5 is a graph illustrating the particle size and particle size distribution of a pigment dispersion after the magnetic milling in accordance with the present embodiments.
Figure 6:
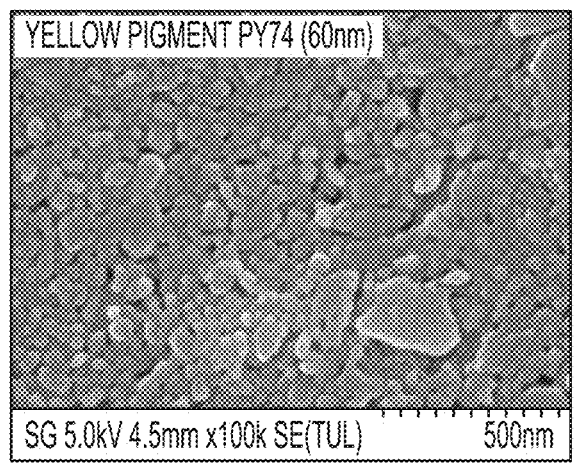
FIG. 6 is a TEM image of a pigment dispersion after the magnetic milling in accordance with the present embodiments.

The particle size and particle size distribution of the yellow pigment dispersion after magnetic milling is shown in FIG. 5. The TEM image of the yellow pigment dispersion after magnetic milling is shown in FIG. 6.

Example 2

Preparation of Yellow Pigment Dispersion (Scale Up)

Magnetic milling was conducted with magnetic particles and non-magnetic abrasives. Into a 85 ml glass bottle was added 45.8 g of the wetted pigment dispersion obtained in Example 1, and 27.28 g of 35 micron iron oxide magnetic particles and 13.22 g of nonmagnetic abrasives $Al_2O_3$ (<10 micron) at about 50:50 abrasive concentration.

Figure 7:
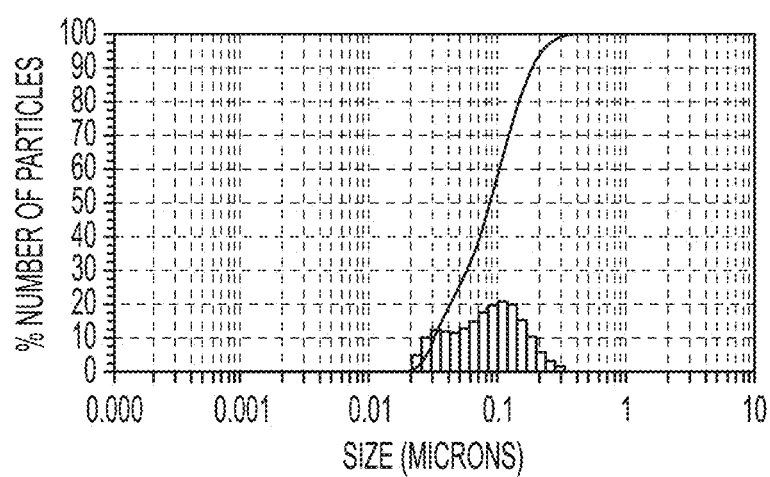
FIG. 7 is a graph illustrating the particle size and particle size distribution of a pigment dispersion (scale up) after the magnetic milling in accordance with the present embodiments.

The vial was then spinned using an agitator at 75 rpm beside a permanent magnet having magnetic field about 400 mT. The particle size of pigment was then measured after spun overnight. The particle size and particle size distribution of the resulting yellow pigment dispersion are shown in FIG. 7. The data indicated that the D50 of resulting yellow pigment dispersion is 85.9 nm, with 95% of the particles smaller than 214.1 nm. TEM image also indicated that the original rod shaped pigment particles were broken into smaller particles Example 3

Stability of Resulting Pigment Dispersion

Figure 8:
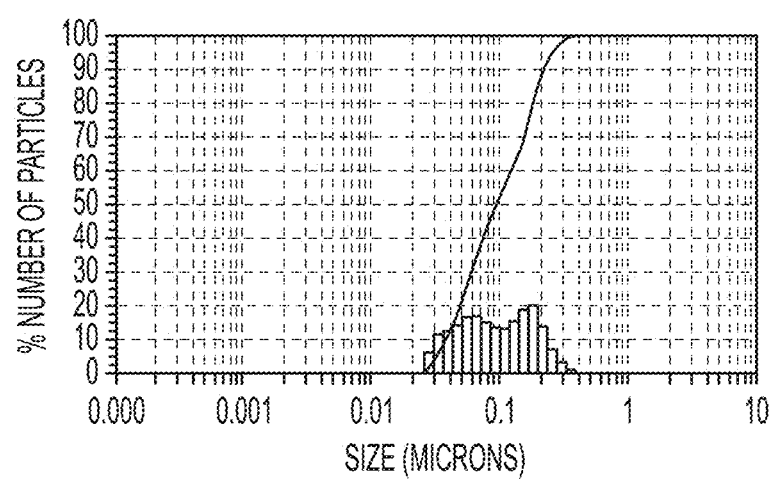
FIG. 8 is a graph illustrating the particle size and particle size distribution of a two-month old pigment dispersion (scale up) after the magnetic milling in accordance with the present embodiments.

After 2 months of storage in a sealed jar at room temperature, the yellow pigment dispersion of Example 2 was remixed and measured again. The particle size and particle size distribution are shown in FIG. 8. The D50 of 2-month old yellow pigment dispersion was measured to be 93.7 nm and 95% of particles were smaller than 251 nm, which demonstrates good pigment stability.

Comparative Example 4

Preparation of Carbon Black Pigment Dispersion

Into a 9 mL vial was added 0.85 g of carbon black pigment powder Regal 330, 1.37 g of DIW, 0.45 g (18.75 wt %) tayca power and 2.62 mL of 35 micron iron oxide and nonmagnetic abrasives $Al_2O_3$ (<10 micron) at different abrasive concentration.

The vial was then spun using an agitator at 400 rpm beside a permanent magnet having magnetic field about 400 mT. The particle size of pigment was then measured at different time interval until particle size stabilized.

Comparative Examples 5 and 6

Comparative Examples 5 and 6 were prepared according to the method described for Example 4, except that Cyan pigment PB15:3 and magenta pigment PR122 was used respectively instead of carbon black pigment. Table 2 shows the

TABLE 2

| | Mean Diameter (micron) of pigment dispersions | | |
|---|---|---|---|
| Time (h) | Carbon black (regal 330) | Cyan (PB15:3) | Magenta (PR122) |
| 0.00 | 0.1861 | 0.2459 | 0.3150 |
| 0.04 | 0.1588 | | |
| 0.08 | 0.1411 | 0.1777 | 0.2506 |
| 0.17 | 0.1396 | | |
| 0.25 | 0.1349 | 0.1626 | 0.2176 |
| 0.33 | 0.1356 | | |
| 0.42 | 0.1316 | | |
| 0.50 | 0.1317 | 0.1542 | 0.2001 |
| 1.00 | 0.1333 | 0.1328 | 0.1954 |
| 1.50 | 0.1338 | | |
| 2.00 | 0.1297 | 0.1349 | 0.1682 |
| 2.50 | 0.1259 | | |
| 3.00 | 0.1291 | 0.1351 | 0.1756 |
| 16.00 | | 0.1883 | |

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A method for producing a milled pigment dispersed in aqueous media, the method comprising:
   mixing a pigment with water for a period of time sufficient to produce an aqueous pigment dispersion;
   adding magnetic particles and non-magnetic abrasive particles to the pigment dispersion, thereby producing a pigment dispersion containing magnetic particles and non-magnetic abrasive particles, wherein the magnetic particles have a diameter of 5 nm to 1000 nm, and further wherein the non-magnetic abrasive particles are selected from the group consisting of ferric oxide, aluminum oxide, or mixtures thereof and have a diameter of 5 nm to 1000 nm;

applying a constant magnetic field to the pigment dispersion containing magnetic particles and non-magnetic abrasive particles, at a magnetic field strength effective for causing the magnetic particles to move relative to the pigment and non-magnetic abrasive particles, which in turn causes the pigment to be milled by the non-magnetic abrasive particles, thereby producing a pigment dispersion comprising a milled pigment having an average particle size of 10 nm to 500 nm dispersed in aqueous media.

2. The method of claim 1, wherein the magnetic field strength is 10 Gauss to 50,000 Gauss.

3. The method of claim 1, wherein the magnetic field is applied through one or more electromagnets, or a permanent magnet.

4. The method of claim 1, wherein the magnetic field is stationary or moving.

5. The method of claim 1, wherein the magnetic particles are selected from the group consisting of a paramagnetic material, ferromagnetic material, antiferromagnetic material and mixtures thereof.

6. The method of claim 1, wherein the non-magnetic abrasive particles have a nano indentation hardness value of 5 to 50 GPa.

7. The method of claim 1, wherein the non-magnetic abrasive particles are selected from the group consisting of aluminum oxide, SiC, cerium oxide, zirconium oxide, ferric oxide, bauxite, cubic zirconia powder, diamond powder, and mixtures thereof.

8. The method of claim 1, wherein the weight ratio of magnetic particles to non-magnetic abrasive particles is in a range of from about 0.5:10 to about 10:0.5.

9. The method of claim 1, wherein the volume ratio of the magnetic particles and non-magnetic abrasive particles to the pigment is in a range of from about 0.5:10 to about 10:0.5.

10. The method of claim 1, wherein the weight of the milled pigment is from about 1 to about 50% by weight of the pigment dispersion.

11. The method of claim 1, wherein the milled pigment has an average particle size of 10 nm to 100 nm dispersed in aqueous media.

12. The method of claim 1, wherein the duration of the process is from about 0.01 to about 5000 hours.

13. A method for producing a milled pigment dispersed in aqueous media, the method comprising:

mixing a pigment with water for a period of time sufficient to produce an aqueous pigment dispersion;

adding magnetic particles and non-magnetic abrasive particles to the pigment dispersion, thereby producing a pigment dispersion containing magnetic particles and non-magnetic abrasive particles, wherein the magnetic particles have a diameter of 5 nm to 1000 nm, and further wherein the non-magnetic abrasive particles are selected from the group consisting of ferric oxide, aluminum oxide, or mixtures thereof and have a diameter of 5 nm to 1000 nm;

agitating the pigment dispersion containing magnetic particles and non-magnetic abrasive particles while applying a constant magnetic field to the pigment dispersion containing magnetic particles and non-magnetic abrasive particles, at a magnetic field strength effective for causing the magnetic particles to remain substantially stationary while the pigment is milled by the non-magnetic abrasive particles, thereby producing a pigment dispersion comprising a milled pigment having an average particle size of 10 nm to 500 nm dispersed in aqueous media.

14. The method of claim 13, wherein the rate of the agitation is in the range of from about 50 to about 20,000 rpm.

15. The method of claim 13, wherein the agitation occurs during parts of or during the entire process.

16. The method of claim 13, wherein the milled pigment has an average particle size of 10 nm to 100 nm dispersed in aqueous media.

17. A method for producing a milled pigment dispersed in aqueous media, the method comprising:

mixing a pigment with water for a period of time sufficient to produce an aqueous pigment dispersion;

adding magnetic particles and non-magnetic abrasive particles to the pigment dispersion, thereby producing a pigment dispersion containing magnetic particles and non-magnetic abrasive particles, wherein the magnetic particles have a diameter of 5 nm to 1000 nm, and further wherein the non-magnetic abrasive particles have a diameter of 5 nm to 1000 nm;

agitating the pigment dispersion containing magnetic particles and non-magnetic abrasive particles while applying a constant magnetic field to the pigment dispersion containing magnetic particles and non-magnetic abrasive particles, at a magnetic field strength effective for causing the magnetic particles to remain substantially stationary while the pigment is milled by the non-magnetic abrasive particles, thereby producing a pigment dispersion comprising a milled pigment having an average particle size of 10 nm to 100 nm dispersed in aqueous media;

wherein the non-magnetic abrasive comprises ferric oxide, aluminum oxide, or mixtures thereof; and the magnetic field has a strength of from 200 Gauss to 50,000 Gauss.

* * * * *